(12) United States Patent
Li et al.

(10) Patent No.: US 11,537,729 B2
(45) Date of Patent: Dec. 27, 2022

(54) DETECTING AND PREVENTING CIPHER KEY DISCLOSURE

(71) Applicant: LENOVO (Singapore) PTE. LTD., New Tech Park (SG)

(72) Inventors: Scott Wentao Li, Cary, NC (US); Igor Stolbikov, Apex, NC (US); Alfredo Zugasti, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 2 days.

(21) Appl. No.: 17/114,308

(22) Filed: Dec. 7, 2020

(65) Prior Publication Data
US 2022/0179977 A1 Jun. 9, 2022

(51) Int. Cl.
*G06F 21/60* (2013.01)

(52) U.S. Cl.
CPC .................................. *G06F 21/604* (2013.01)

(58) Field of Classification Search
CPC ....................................................... G06F 21/604
See application file for complete search history.

(56) References Cited

U.S. PATENT DOCUMENTS

| | | | | |
|---|---|---|---|---|
| 8,621,237 B1* | 12/2013 | Bailey | ...................... | G06F 21/54 |
| | | | | 713/189 |
| 2016/0132694 A1* | 5/2016 | Dhoolia | ................. | G06F 21/602 |
| | | | | 713/165 |
| 2019/0073483 A1* | 3/2019 | McClintock | .......... | G06F 21/554 |

* cited by examiner

*Primary Examiner* — Linglan Edwards
*Assistant Examiner* — Forrest L Carey
(74) *Attorney, Agent, or Firm* — Kunzler Bean & Adamson

(57) ABSTRACT

For detecting and preventing cipher key disclosure, a method detects software code in a copy buffer. In response to detecting the software code, the method detects a cipher key in the software code. In response to detecting the cipher key, the method communicates a cipher alert that the cipher key is in the software code.

15 Claims, 6 Drawing Sheets

DETECTING AND PREVENTING CIPHER KEY DISCLOSURE

FIELD

The subject matter disclosed herein relates to cipher key disclosure and more particularly relates to detecting and preventing cipher key disclosure.

BACKGROUND

A cipher key may be included in software code.

BRIEF SUMMARY

A method for detecting and preventing cipher key disclosure is disclosed. The method detects, by use of a processor, software code in a copy buffer. In response to detecting the software code, the method detects a cipher key in the software code. In response to detecting the cipher key, the method communicates a cipher alert that the cipher key is in the software code. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
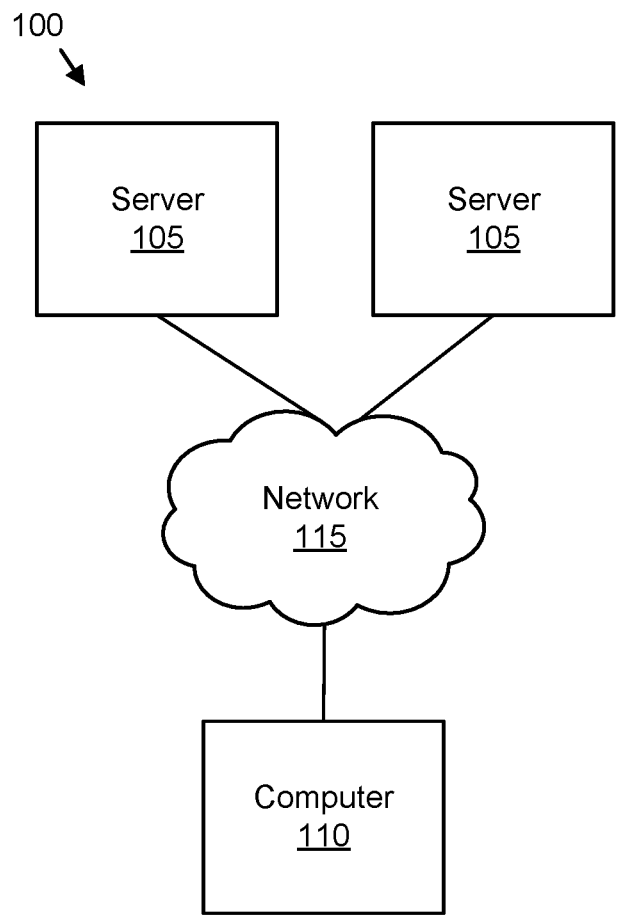
FIG. 1 is a schematic block diagram illustrating one embodiment of a computer system.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a computer system 100. In the depicted embodiment, the computer system 100 includes at least one server 105, a network 115, and a computer 110. The servers 105 and the computer 110 may communicate via the network 115. The network 115 may be the Internet, a local area network, a Wi-Fi network, a mobile telephone network, or combinations thereof. The computer system 100 may perform a variety of tasks including developing software. A server 105 may provide resources and services. In addition, a server 105 may host a software repository.

A user may employ a cipher key to access resources of a server 105. The cipher key may be included in software code. In addition, the cipher key may be part of a document. Unfortunately, the user may inadvertently copy the cipher key as part of the software code or document and post the software code or document to the server 105. For example, the user may copy the cipher key as part of software code to an online repository hosted by the server 105. As a result, the cipher key is inadvertently exposed. If the cipher key is subsequently misused used by a third-party, the user could be exposed to significant costs and/or losses.

The embodiments detect the software code in a copy buffer and in response to detecting the software code, detect the cipher key in the software code. In response to detecting the cipher key, the embodiments communicate a cipher alert, warning the user against inadvertent disclosure of the cipher key. As a result, the cipher key is protected from accidental disclosure.

Figure 2:
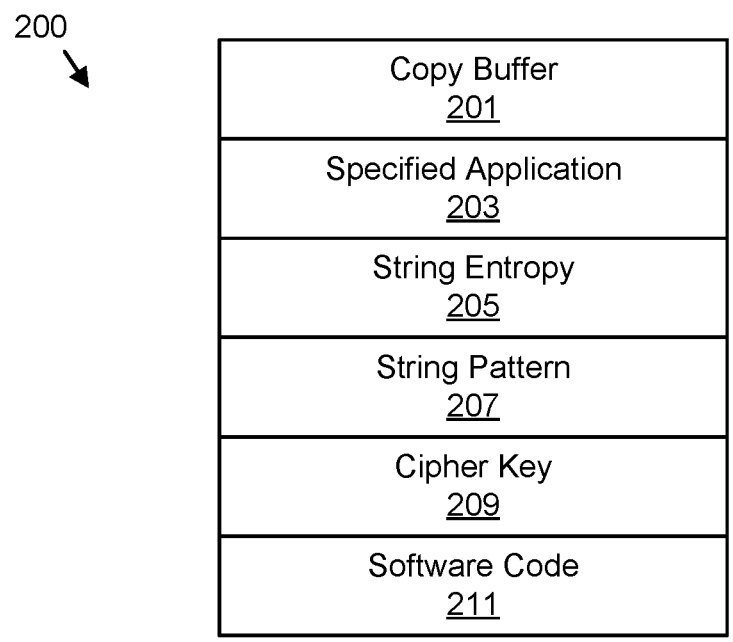
FIG. 2 is a schematic block diagram illustrating one embodiment of a cipher key data.

FIG. 2 is a schematic block diagram illustrating one embodiment of a cipher key data 200. The cipher key data 200 may be employed to detect an inadvertent disclosure of a cipher key 209. The cipher key data 200 may be organized as a data structure in a memory. In the depicted embodiment, the cipher key data 200 includes a copy buffer 201, at least one specified application 203, a string entropy 205, at least one string pattern 207, the cipher key 209, and software code 211.

The software code 211 may be generated on and/or reside on the computer 110. The cipher key 209 may be included in the software code 211. The software code 211 may interact with external resources and/or services hosted on a server 105. The cipher key 209 may function as a web cipher and/or Application Program Interface (API) to allow the software code 211 to access the external services and/or resources. The cipher key 209 may provide access to resources via an API for the software code 211.

The copy buffer 201 may receive copied content for the computer 110. The copied content in the copy buffer 201 may be further pasted to various channels and/or buffers. For example, the contents of the copy buffer 201 may be pasted to a repository hosted by the server 105.

The at least one specified application 203 may specify a software application that may be the destination of contents of the copy buffer 201. In addition, the specified application 203 may specify a software application that is the source of the software code 211. The specified application 203 may be a paste operation. In addition, the specified application 203 may be an upload operation. The specified application 203 may be an online repository. The specified application 203 may be a known transport mechanism for copying software code 211 to a server 105 or the like.

The string entropy 205 may record an entropy for strings in the copy buffer 201 and/or software code 211. In one embodiment, the string entropy 205 is calculated as an inverse of the probability of a string appearing in the copy buffer 201 and/or software code 211.

The at least one string pattern 207 may be a common cipher key pattern. For example, the string pattern 207 may describe mixtures of uppercase characters, lowercase characters, integers, and special characters that may appear in the cipher key 209. The string pattern 207 may be employed to identify the cipher key 209.

In one embodiment, the at least one string pattern 207 is a common software code pattern. For example, the string pattern 207 may include strings and/or formats commonly used in software code 211. The string pattern 207 may be employed to identify the software code 211.

Figure 3A:
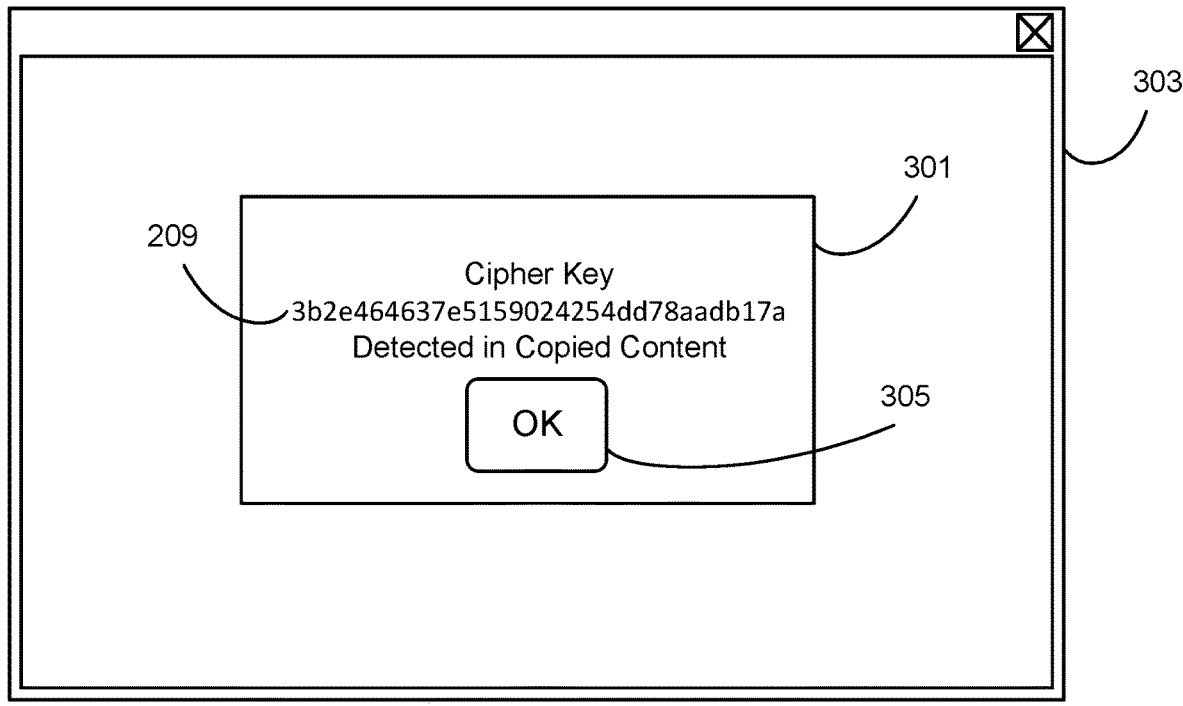
FIG. 3A is a drawing illustrating one embodiment of a cipher alert.

FIG. 3A is a drawing illustrating one embodiment of a cipher alert 301. In the depicted embodiment, the cipher alert 301 is presented in a window 303 of a display for the computer 110. The cipher alert 301 may include the cipher key 209. The cipher alert 301 may warn the user that the cipher key 209 is detected in content such as copied content in the copy buffer 201. In one embodiment, the user may accept an alert acknowledgment 305 for the cipher alert 301. The user may not proceed without accepting the alert acknowledgment 305.

Figure 3B:
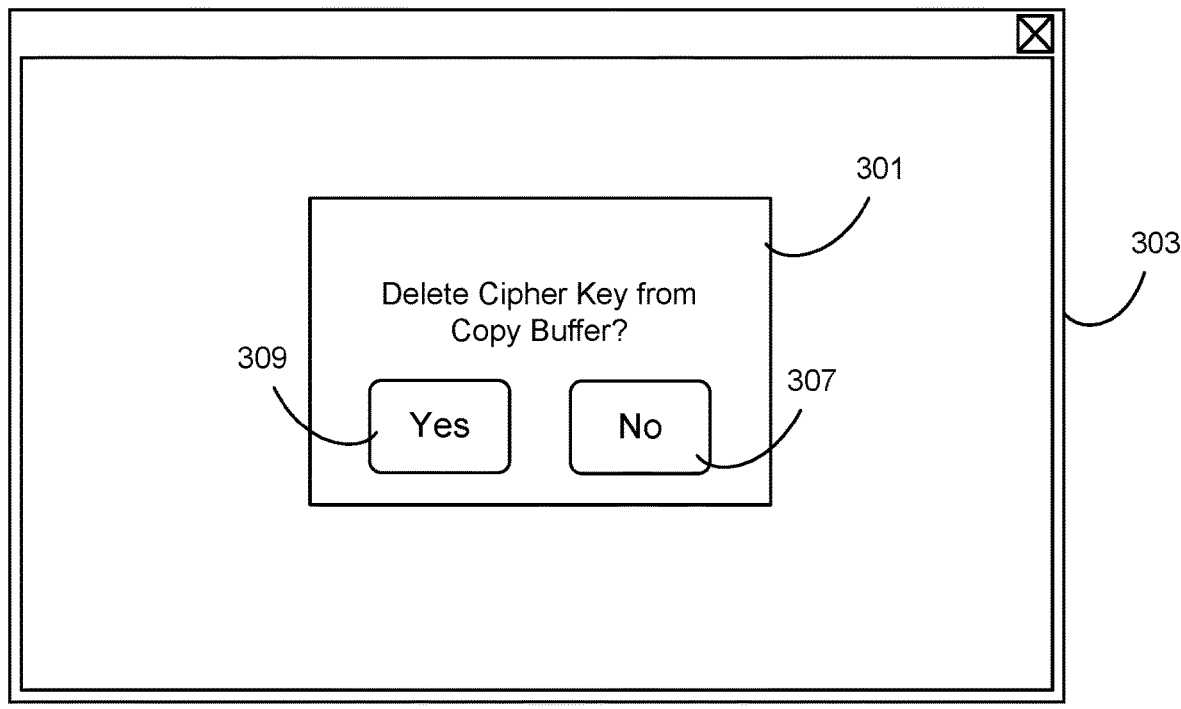
FIG. 3B is a drawing illustrating one alternate embodiment of a cipher alert.

FIG. 3B is a drawing illustrating one alternate embodiment of a cipher alert 301. In the depicted embodiment, the cipher alert 301 presents the user with the choice of whether or not to delete the cipher key 209 from the copy buffer 201. The user may select 'No' 307 to decline deleting the cipher key 209 from the copy buffer 201. In addition, the user may select 'Yes' 309 to accept the deleting the cipher key 209 from the copy buffer 201. In one embodiment, the user may select 309 to scrub the copy buffer 201.

Figure 4A:
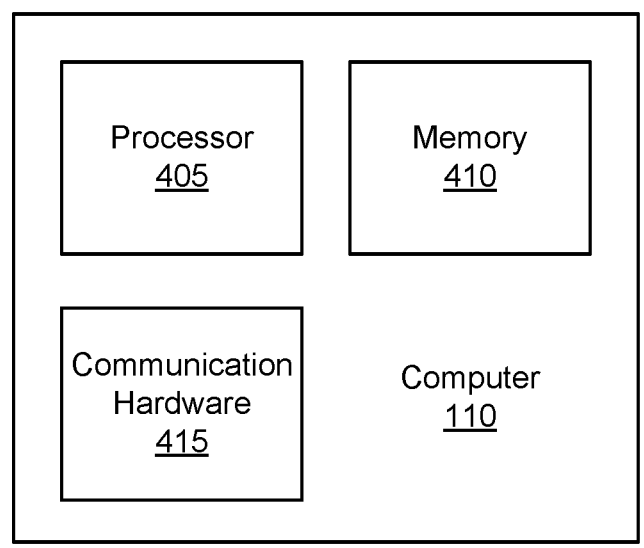
FIG. 4A is a schematic block diagram illustrating one embodiment of a computer.

FIG. 4A is a schematic block diagram illustrating one embodiment of the computer 110. In the depicted embodiment, the computer 110 includes a processor 405, a memory 410, and communication hardware 415. The memory 410 may store code and data. In one embodiment, the memory 410 includes the copy buffer 201. The processor 405 may execute the code and process the data. The communication hardware 415 may communicate with other devices such as the network 115.

Figure 4B:
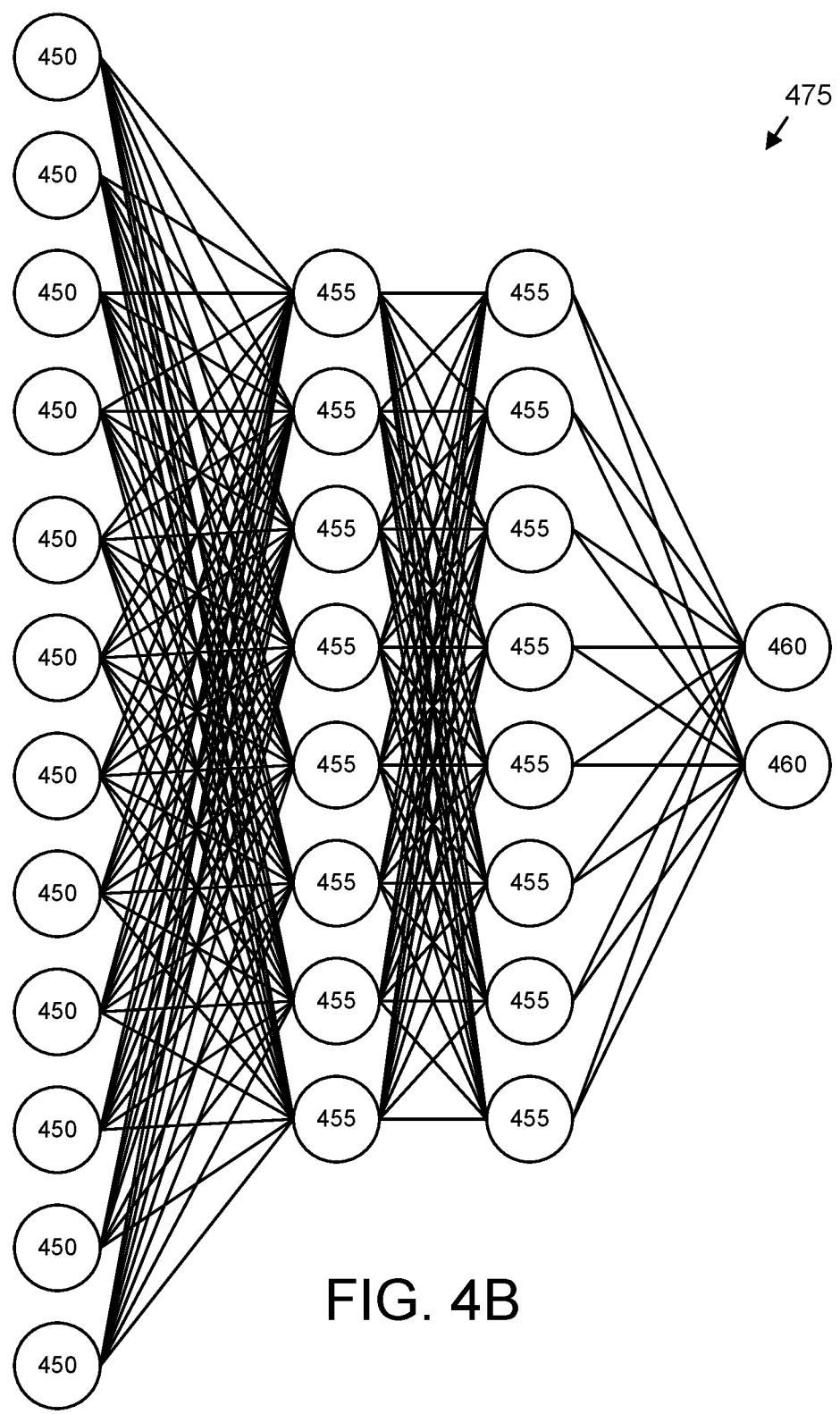
FIG. 4B is a schematic diagram illustrating one embodiment of the neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, long short-term memory network, and the like.

The neural network 475 may be trained with training data. The training data may include cipher keys 209 and/or software code 211. Some training data may include software code 211. In addition, some training data may include cipher keys 209. The neural network 475 may be trained using one or more learning functions while applying the training data to the input neurons 450 and known result values for the output neurons 460. Subsequently, the neural network 475 may receive actual data at the input neurons 450 and make predictions of cipher keys 209 and/or software code 211 at the output neurons 460 based on the actual data. The actual data may be the contents of the copy buffer 201.

Figure 5:
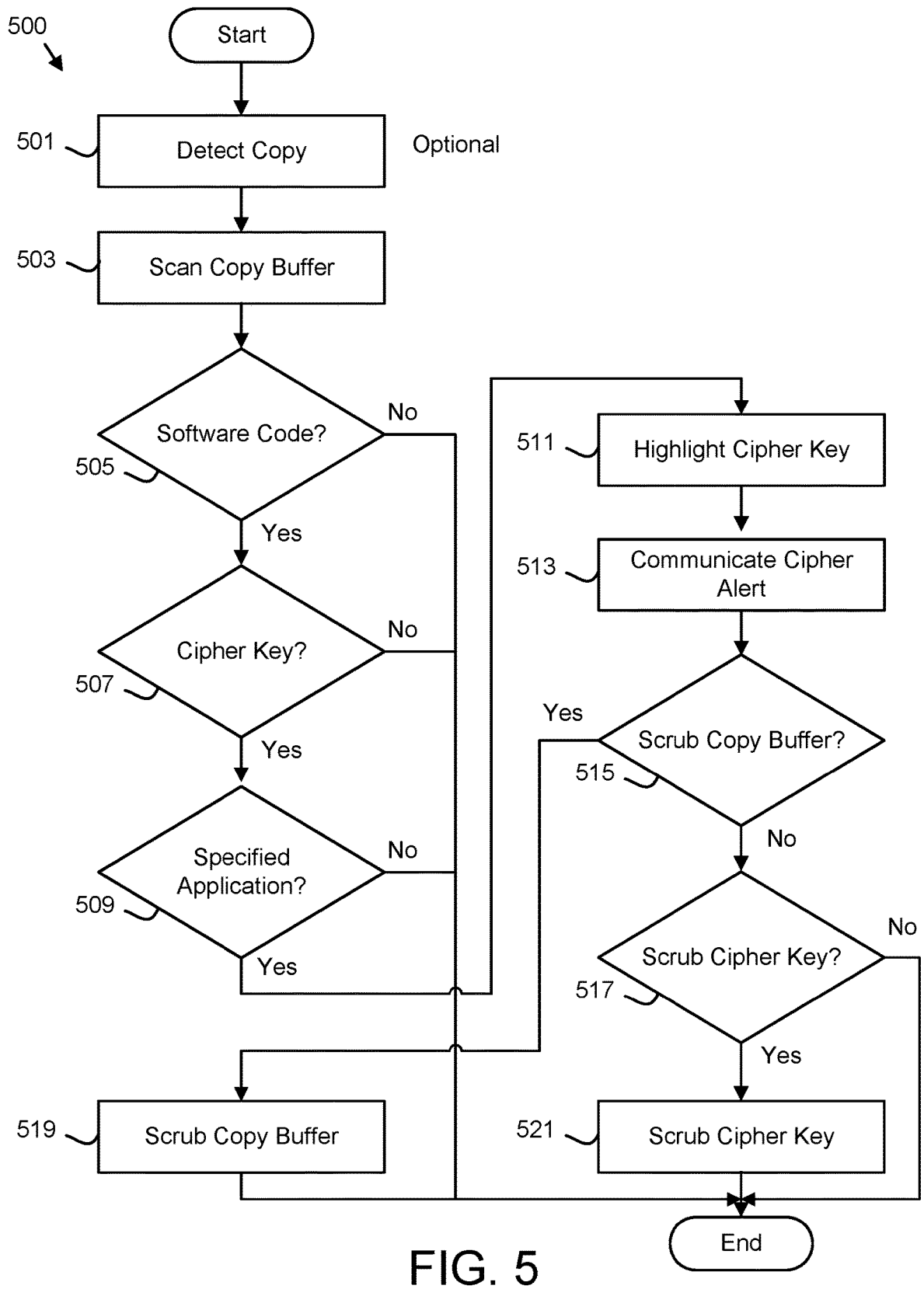
FIG. 5 is a schematic flow chart diagram illustrating one embodiment of a cipher key disclosure prevention method.

FIG. 5 is a schematic flow chart diagram illustrating one embodiment of a cipher key disclosure prevention method 500. The method 500 may detect and prevent cipher key disclosure. The method 500 may be performed by the computer 110 and/or processor 405.

The method 500 starts, and in one embodiment, the processor 405 detects 501 a copy to the copy buffer 201. For example, the user may initiate a copy operation on the computer 110 to copy content to the copy buffer 201. The processor 405 detects 501 the copy operation.

In one embodiment, the processor 405 detects 501 a paste of the copied content from the copy buffer 201. In a certain embodiment, the processor 405 detects 501 a paste of the copied content from the copy buffer 201 to an external device such as the server 105.

The processor 405 may scan 503 the copy buffer 201. The copy buffer 201 may be scanned 503 in response to detecting

501 the copy to the copy buffer 201, a paste from the copy buffer 201, and/or a paste from the copy buffer 201 to an external device.

The processor 405 detects 505 software code 211 in the copy buffer 201. In one embodiment, the processor 405 compares the contents of the copy buffer 201 to string patterns 207 for software code 211. Software code 211 may be detected if content in the copy buffer 201 match one or more string patterns 207.

In one embodiment, the processor 405 employs the neural network 475 to detect 505 the software code 211. If software code 211 is not detected 505, the method 500 ends.

In response to detecting the software code 211 in the copy buffer 201, the processor 405 detects 507 the cipher key 209 in the software code 211. In one embodiment, the cipher key 209 is detected 507 based on the string entropy 205. For example, the cipher key 209 may be detected 507 in the software code 211 as a string as having a string entropy 205 that exceeds in entropy threshold.

In one embodiment, the cipher key 209 is detected 507 based on the string patterns 207. For example, strings of the software code 211 may be compared against string patterns 207 for cipher keys 209. Strings that match cipher key string patterns 207 may be detected 507 as cipher keys 209.

In one embodiment, the processor 405 employs the neural network 475 to detect 507 the cipher key 209. If the cipher key 209 is not detected 507, the method 500 ends.

In a certain embodiment, in response to detecting 507 the cipher key 209, the processor 405 detects 509 that the software code 211 is copied to a specified application 203. For example, the processor 405 may detect 509 that the software code 211 is copied to an online repository. If the software code 211 is not detected 509 copied to the specified application 203, the method 500 may end. If the software code 211 is detected 509 copied to the specified application 203, the processor 405 may alert the user with the cipher alert 301 as will be described hereafter In response to detecting 507 the cipher key 209 and/or in response to detecting 509 that the software code 211 is copied to the specified application 203, the processor 405 may highlight 511 the cipher key 209. The cipher key 209 may be highlighted 511 in copied content. In addition, the cipher key 209 may be highlighted 511 in a cipher alert 301.

The processor 405 may communicate 513 the cipher alert 301 to the user of the computer 110. The cipher alert 301 may be communicated 513 as shown in FIGS. 3A-B.

In one embodiment, the processor 405 determines 515 whether to scrub the copy buffer 201. The processor 405 may determine 515 to scrub the copy buffer 201 in response to the user selecting 309 to scrub the copy buffer 201. Alternatively, the processor 405 may automatically determine 515 to scrub the copy buffer 201 in response to detecting 509 the software code 211 is copied to the specified application 203. The processor 405 may determine 515 not to scrub the copy buffer 201 in response to a user decline 307.

If the processor 405 determines 515 to scrub the copy buffer 201, the processor 405 scrubs 519 the copy buffer 201 and the method 500 ends. The copy buffer 201 may be scrubbed 519 with a destructive delete wherein no content may be recovered from the copy buffer 201.

If the processor 405 determines 515 not to scrub the copy buffer 201, the processor 405 determines 517 whether to scrub the cipher key 209. The processor 405 may determine 517 to scrub the cipher key 209 in response to a user selection 309 to accept deleting the cipher key 209 from the copy buffer 201. Alternatively, the processor 405 may automatically determine 517 to scrub the cipher key 209 in response to detecting 509 the software code 211 and/or cipher key 209 is copied to the specified application 203. The processor 405 may determine 517 not to scrub the cipher key 209 in response to a user decline 307.

If the processor 405 determines 517 not to scrub the cipher key 209, the method 500 ends. In response to determining 517 to scrub the cipher key 209, the processor 405 scrubs 521 the cipher key 209 from the copy buffer 201 and the method 500 ends. The cipher key 209 may be scrubbed 521 with a destructive delete.

The embodiments detect the software code 211 in the copy buffer 201. In addition, in response to detecting the software code 211, the embodiments detect the cipher key 209 in the software code 211. In response to detecting the cipher key 209 the embodiments communicate the cipher alert 301 to the user, indicating that the cipher key 209 is in the software code 211. As a result, the user is prevented from inadvertently disclosing the cipher code 209. Thus, the efficiency and utility of the computer 110 is improved.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
training, by use of a processor, a neural network with training cipher keys and training software code;
detecting software code in a copy buffer;
in response to detecting the software code, detecting, by use of the neural network, a cipher key in the software code, wherein the cipher key provides access to a specified application via an Application Programming Interface (API) for the software code;
in response to detecting the cipher key in the software code, detecting that the software code is copied to the specified application, wherein the specified application is an online repository; and
in response to detecting the cipher key and detecting that the software code is copied to the specified application, communicating a cipher alert that the cipher key is in the software code.

2. The method of claim 1, the method further comprising scrubbing the copy buffer.

3. The method of claim 1, wherein the cipher key is further detected based on string entropy.

4. The method of claim 1, wherein the cipher key is further detected based on string patterns.

5. The method of claim 1, wherein the cipher alert comprises the cipher key.

6. An apparatus comprising:
a processor;
a memory storing code executable by the processor to:
train a neural network with training cipher keys and training software code;
detect software code in a copy buffer;
in response to detecting the software code, detect, using the neural network, a cipher key in the software code, wherein the cipher key provides access to a specified application via an Application Programming Interface (API) for the software code;
in response to detecting the cipher key in the software code, detect that the software code is copied to the specified application, wherein the specified application is an online repository; and in response to detecting the cipher key and detecting that the software code is copied to the specified application, communicate a cipher alert that the cipher key is in the software code.

7. The apparatus of claim 6, wherein the code is further executable by the processor to scrub the copy buffer.

8. The apparatus of claim 6, wherein the cipher key is further detected based on string entropy.

9. The apparatus of claim 6, wherein the cipher key is further detected based on string patterns.

10. The apparatus of claim 6, wherein the cipher alert comprises the cipher key.

11. A program product comprising a non-transitory computer readable storage medium that stores code executable by a processor, the executable code comprising code to:

train a neural network with training cipher keys and training software code;

detect software code in a copy buffer;

in response to detecting the software code, detect, using the neural network, a cipher key in the software code, wherein the cipher key provides access to a specified application via an Application Programming Interface (API) for the software code;

in response to detecting the cipher key in the software code, detect that the software code is copied to the specified application, wherein the specified application is an online repository; and in response to detecting the cipher key and detecting that the software code is coped to the specified application, communicate a cipher alert that the cipher key is in the software code.

12. The program product of claim 11, wherein the code is further executable by the processor to scrub the copy buffer.

13. The program product of claim 11, wherein the cipher key is further detected based on string entropy.

14. The program product of claim 11, wherein the cipher key is further detected based on string patterns.

15. The program product of claim 11, wherein the cipher alert comprises the cipher key.

\* \* \* \* \*